United States Patent
Cui et al.

(10) Patent No.: US 10,423,617 B2
(45) Date of Patent: *Sep. 24, 2019

(54) REMOTE QUERY OPTIMIZATION IN MULTI DATA SOURCES

(71) Applicant: International Business Machines Corporation, Armonk, NY (US)

(72) Inventors: Lei Cui, Beijing (CN); Yi Dai, Beijing (CN); Ya Qiong Liu, Beijing (CN); Xing Xing Shen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 581 days.

This patent is subject to a terminal disclaimer.

(21) Appl. No.: 15/210,958

(22) Filed: Jul. 15, 2016

(65) Prior Publication Data

US 2018/0018367 A1   Jan. 18, 2018

(51) Int. Cl.
*G06F 16/20* (2019.01)
*G06F 16/2453* (2019.01)
*G06F 16/21* (2019.01)

(52) U.S. Cl.
CPC ...... *G06F 16/24534* (2019.01); *G06F 16/217* (2019.01)

(58) Field of Classification Search
None
See application file for complete search history.

(56) References Cited

U.S. PATENT DOCUMENTS

| | | | |
|---|---|---|---|
| 6,615,203 B1 | 9/2003 | Lin et al. | |
| 7,720,838 B1 | 5/2010 | Li et al. | |
| 8,122,008 B2 | 2/2012 | Li et al. | |
| 9,633,076 B1* | 4/2017 | Morton | G06F 16/248 |
| 2007/0067274 A1 | 3/2007 | Han et al. | |
| 2015/0169686 A1 | 6/2015 | Elias et al. | |
| 2016/0321330 A1* | 11/2016 | Ziegler | G06F 3/04842 |
| 2019/0034489 A1* | 1/2019 | Ziegler | G06F 16/248 |

OTHER PUBLICATIONS

Wang, Di; "Efficient Query Optimization for Distributed Join in Database Federation"; A Thesis Submitted to the Faculty of the Worcester Polytechnic Institute; Mar. 2009; 63 pages.
"Federated Database Pushdown Analysis"; IBM; Printed May 11, 2016; 4 pages; <http://www.ibm.com/support/knowledgecenter/SSEPGG_9.5.0/com.ibm.db2.luw.admin.perf.doc/doc/c0005325.html?lang=sk>.
Cui et al., "Remote Query Optimization in Multi Data Sources", U.S. Appl. No. 15/811,716, filed Nov. 14, 2017, 18 pages.
Appendix P—List of IBM Patents or Patent Applications Treated as Related, Filed herewith, 2 Pages.

* cited by examiner

*Primary Examiner* — Belix M Ortiz Ditren
(74) *Attorney, Agent, or Firm* — Khyle J. Eaton; Brian M. Restauro

(57) ABSTRACT

Embodiments of the present invention provide systems and methods for remote query optimization in multi data sources. The method includes receiving a database query from a remote source requesting data-points from multiple data sources. The method further includes receiving and analyzing the data-points, creating a data set based on the analysis, and transmitting the data set to the remote source.

9 Claims, 5 Drawing Sheets

310 ┐

BigSQL_TAB:

| ID | VERSION | NUM | POST REWRITE |
|---|---|---|---|
| 1 | 1 | a20050111 | G(1,1) = 1.125 |
| 2 | 5 | a20050112 | G(2,5) = 2.625 |
| 3 | 1 | a20050113 | G(3,1) = 3.125 |
| 4 | 3 | a20050114 | G(4,3) = 4.375 |
| 5 | 6 | a20050115 | G(5,6) = 5.75 |

312 – ID, 314 – VERSION, 316 – NUM, 318 – POST REWRITE
320 – row 1, 322 – row 2, 324 – row 3, 326 – row 4, 328 – row 5

350 ┐

DB2_TAB:

| ID | VERSION | NAME | POST REWRITE |
|---|---|---|---|
| 1 | 1 | 2006032401 | G(1,1) = 1.125 |
| 2 | 2 | 2006032402 | G(2,2) = 2.25 |
| 8 | 3 | 2006032403 | G(8,3) = 8.375 |
| 10 | 4 | 2006032404 | G(10,4) = 10.5 |
| 100 | 7 | 2006032408 | G(100) = 100.875 |

352 – ID, 354 – VERSION, 356 – NAME, 358 – POST REWRITE
360 – row 1, 362 – row 2, 364 – row 3, 366 – row 4, 368 – row 5

FIG. 3A

380
```
SELECT * FROM BigSQL_TAB T1
    JOIN DB2_TAB T2 on T1.ID = T2.ID and T1.VERSION = T2.VERSION
```

FIG. 3B

390
```
SELECT DT.PART
FROM
    (
    SELECT ROOT.PART, ROOT.SUBPART,
    FROM BigSQL_PARTLIST ROOT
    WHERE ROOT.PART = '01'
    UNION
    SELECT CHILD.PART, CHILD.SUBPART,
    FROM DB2_RPL PARENT,
        DB2_PARTLIST CHILD
    WHERE PARENT.SUBPART = CHILD.PART
    )DT
    ORDER BY DT.PART
    WHERE DT.PART < 100
    FETCH FIRST 20 ROWS ONLY
```

REMOTE QUERY OPTIMIZATION IN MULTI DATA SOURCES

BACKGROUND OF THE INVENTION

The present invention relates generally to the field of computer databases, and more particularly to the optimization of data retrieval from multi data sources.

Database tuning is the process of increasing the speed of the database query return. An example of database tuning is structuring data into very specific types of file or database structures which allows for faster searching and access to specific types/pieces of data, and decrease the burden on the network, or both. However, these specific types of file or database structures have to be coded by programmers to match with specific query types based on how the programmers believe the database will be accessed. If the data sources are used only as intended, then there may be a decrease in the amount of data transferred and subsequently a decrease in the burden on the network. This may be time consuming for the programmers writing the databases. Additionally, if a query is outside the anticipated query types, the database may no longer be optimized and large data transfers may still occur. Even if the file structures are queried in ways that the database is designed for, large quantities of unnecessary data may still be transferred to the remote query source, yet portions of the data may be determined to be unnecessary once the data is received by the source of the query.

SUMMARY

According to one embodiment of the present invention, a method for remote query optimization in multi data sources is provided, the method comprising: receiving, by one or more processors, a database query from a remote source, wherein the query requests one or more groupings of data-points from each of two or more data sources; receiving, by one or more processors, the one or more groupings of data-points from each of the two or more data sources; analyzing, by one or more processors, the one or more groupings of data-points from each of the two or more data sources; creating, by one or more processors, a data set, wherein the data set comprises the analyzed one or more groupings of data-points; and transmitting, by one or more processors, the data set to the remote source.

According to another embodiment of the present invention, a computer program product for remote query optimization in multi data sources is provided, based on the method described above.

According to another embodiment of the present invention, a computer system for remote query optimization in multi data sources is provided, based on the method described above.

BRIEF DESCRIPTION OF THE DRAWINGS

FIG. 3A depicts an example of a set of data, in accordance with an embodiment of the present invention;

FIG. 3B depicts an example of a SQL JOIN query, in accordance with an embodiment of the present invention;

FIG. 3C depicts an example of a SQL UNION query, in accordance with an embodiment of the present invention.

DETAILED DESCRIPTION

Optimizing database performance is one of the most challenging topics in the software industry today. Speed is often an expected part of computer interaction, and the transfer of large data sets (i) can become more expensive the more data is transmitted; (ii) can slow down the system which causes frustration on the part of the user; and (iii) can use up limited resources unnecessarily. These limited resources may include, but are not limited to: bandwidth, processing power, memory, and computational time. Databases are often quite large, with numerous pieces of data. In order to retrieve this data from a database, a remote source will query the database. Often, data that is not needed by the source of a remote query is transmitted from a database in a data source, and only once the remote query source receives the data is it possible to determine that specific data is not necessary. Embodiments of the present invention provide efficient systems and methods for accurately determining data necessary for a remote query, using mapping plug-ins at the data sources to analyze data and prune unnecessary data from the final data sets, before transmitting the final data sets to the site of the remote query.

Figure 1:
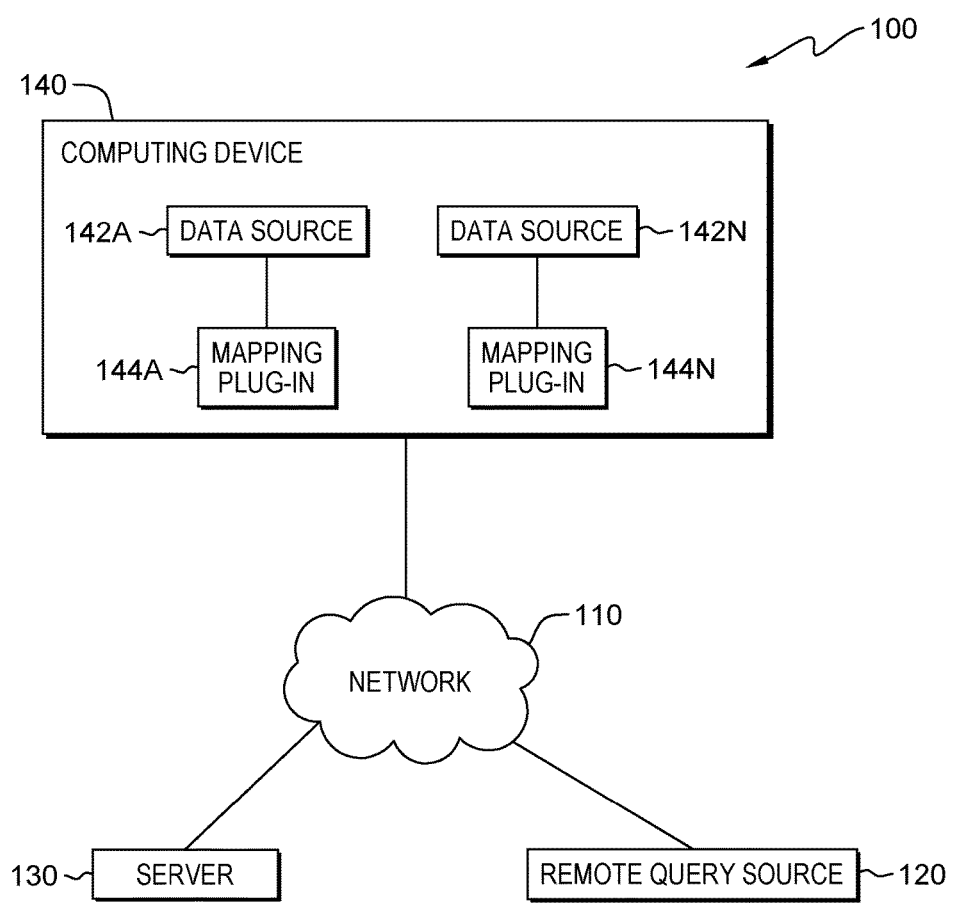
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with an embodiment of the present invention. Modifications to data processing environment 100 may be made by those skilled in the art without departing from the scope of the invention as recited by the claims. In an exemplary embodiment, data processing environment 100 includes remote query source 120, server 130, and computing device 140, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication and/or access between remote query source 120, server 130, and computing device 140.

Remote query source 120, in accordance with an embodiment of the present invention, can be, for example, a web application, a mobile application, a development suite, a development tool, or any computer software or hardware, or combination thereof, capable of executing a data retrieval query from a database using a query language such as the Structured Language Query (SQL). In this exemplary embodiment, remote query source 120 is a separate entity. In other embodiments, remote query source 120 may be stored on server 130.

In the exemplary embodiment, server 130 is a server computer. Server 130 may include internal hardware components, external hardware components, computer software, or any combination of the two. Server 130 may manage access to a centralized resource or service in a network, to await and fulfill requests from client programs in the same or other computers, to be a dedicated resource for a specific task or tasks, such as manage, store, send, and process data, or any combination therein. In various embodiments, server 130 may be a separate entity, or may be included in, or stored on, another entity.

Computing device 140 includes data sources 142A-N and mapping plug-ins 144A-N. In various embodiments of the present invention, computing device 140 can be a laptop computer, a tablet computer, a netbook computer, a personal computer (PC), a desktop computer, a personal digital assistant (PDA), a smart phone, a thin client, or any programmable electronic device capable of executing computer readable program instructions. Computing device 140 may include internal and external hardware components, as depicted and described in further detail with respect to FIG. 4. In this exemplary embodiment, there is a single computing device 140 in data processing environment 100. In other embodiments, there may be multiple computing devices, each with one or more data sources 142A-N and mapping plug-ins 144A-N, all interconnected over network 110.

Data sources 142A-N may be, for example, a database, a data table, a computer file, or a data stream, capable of adding, modifying, deleting, and storing data, and returning the data or portions of the data, when queried by an internal or external source. In this exemplary embodiment, data sources 142A-N are SQL relational database management systems. In various embodiments, data sources 142A-N may be (i) in separate computing devices (not shown) connected over network 110; (ii) a database type other than a SQL relational database; and (iii) more than two data sources (i.e., data sources 142A-N represent any number of data sources in communication between themselves, remote query source 120, and server 130).

Mapping plug-ins 144A-N may be, for example, internal hardware components, external hardware components, computer software, or any combination therein. In this embodiment, mapping plug-ins 144A-N are separate entities from each other, and are directly connected to data sources 142A-142N, respectively, located inside computing device 140. In various embodiments, mapping plug-ins 144A-N may be external and directly connected to, or a component of, computing devices with data sources. In all embodiments, there is a minimum of at least two data sources (see data sources 142A-N), each connected to mapping plug-ins (see mapping plug-ins 144A-N). It is noted that for each data source, there is a mapping plug-in.

Figure 2:
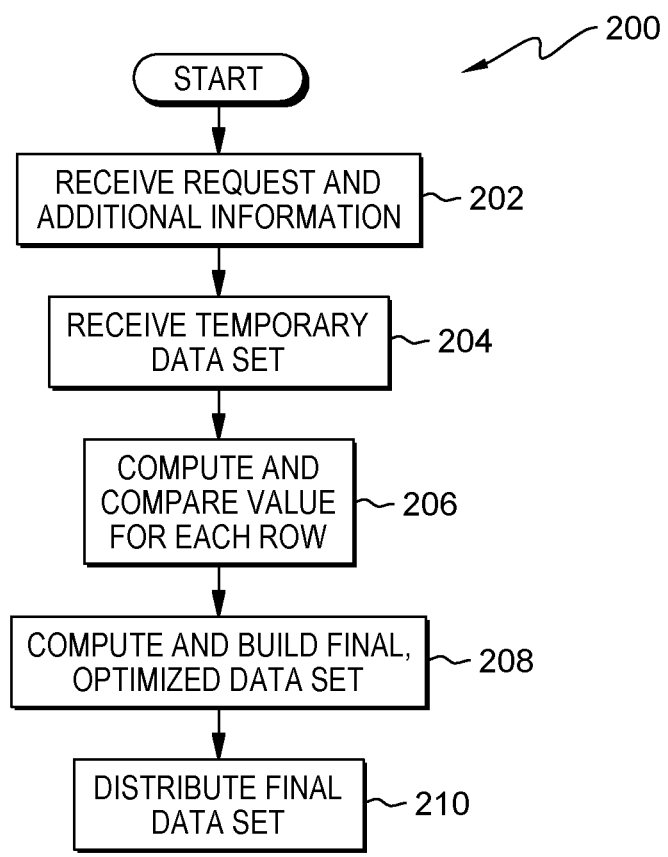
FIG. 2 is a flowchart illustrating operational steps for remotely generating an optimized data set, in accordance with an embodiment of the present invention.

FIG. 2 is a flowchart 200 illustrating operational steps for creating and optimizing, and distributing a data set from multi data sources in response to a remote query, in accordance with an embodiment of the present invention.

In step 202, mapping plug-ins 144A-N receive a request and additional information from remote query source 120. In this exemplary embodiment, the request is a query, such as a SQL JOIN or UNION query, and the additional information may be join keys or other information used for a mapping function. In other embodiments, queries may be other types of SQL queries, or queries in programming languages other than SQL.

In step 204, mapping plug-ins 144A-N receive a data set from each of the respective data sources 142A-N. In an exemplary embodiment, the data set is a set of data, generally stored over multiple tables, that data sources 142A-N return when a query is received. The data set may include, but is not limited to: database columns, database rows, or other groupings of data from an exemplary SQL database, a MySQL database, a BIG DATA database, or other relational databases.

In step 206, mapping plug-ins 144A-N compute then compare a value for each column, row, or other grouping of data. In this exemplary embodiment, mapping plug-ins 144A-N compute values for the data in the data sets by mapping a function for each row, and then comparing the computed value. For example, if there are two data tables on different servers, table A on server SA(SA.A) and table B on server SB(SB.B), and the join query is predicated on AND (SA.A.C1=SB.B.C1 AND SA.A.C2=SB.B.C2), all the columns of each table that are received for the query are mapped to real numbers which can identify the unique column values equation (val[A]=G(A.C1, A.C2), val[B]=G (B.C1, B.C2)).

In step 208, mapping plug-ins 144A-N compute and build the final, optimized data set to be distributed. In an exemplary embodiment, once the columns of each database that are received for the query are mapped to real numbers (i.e., step 206), the calculated real numbers (val[A] and val[B]) are then compared to each other, and only those columns whose real numbers satisfy the join predicate val[A]=val[B] are selected out. Those selected out are then compared to the counterpart column pairs (C1,C2) from data sources 142A-N(e.g., those columns from different data sources that match each other. For example, if each data source has a "First Name" column.) for the join predicate values, and are chosen from the data table from data sources 142A-N. The counterpart column pairs (C1,C2) from the data tables are then used to build the final, optimized data set. In another exemplary embodiment, C1,C2, ... , Cn are the columns for a join, and are ordered sequences. Cn+1, ... , Cm are the other columns. In this embodiment, for mapping plug-ins 144A-N, g(Ci) is the mapping function for column Ci to convert Ci to integer values, f(x) is the probability density function, F(x) is the probability distribution function, and G( ) is the final mapping function for each row. G( ) is a recursive equation, where:

$$G(C1)=g(C1), G(C1,C2)=g(C1)+F(G(C2,C3,\ldots,CN)),\ldots,G(C1,C2,\ldots,Cn)=g(C1)+F(G(C2,C3,\ldots,Cn)).$$

The order of G( ) is determined by the order of columns, meaning that if C1(1)>C1(2), for each Ci(1) and Ci(2), where i>1, then:

$$G(C1(1),C2(1),\ldots,Cn(1))>G(C1(2),C2(2),\ldots,Cn(2)).$$

The mapping function g(Ci) for this exemplary embodiment may function on different data types differently, such as using the original value if the data type is an integer, converting small strings to an integer if the data type is a string, and converting data to a float type if the data type is binary. The mapping function then supposes that Max=max (g(Ci))+1, Min=min(g(Ci))−1, and F(x) uses a uniform distribution function. Because of this, F(x)=(x−Min)/(Max−Min). Based on these formulas, final mapping function G( ) is able to be determined.

In step 210, mapping plug-ins 144A-N distribute the final data set. In an exemplary embodiment, the final data set is the final mapping function G( ) (i.e., step 208). In some embodiments, mapping plug-ins 144A-N may determine it is necessary for the final data set to be consolidated and formatted before transmission to match the specifications of remote query source 120. In this exemplary embodiment, once consolidated and formatted as necessary, the final data set is sent over network 110 to remote query source 120.

FIG. 3A is an example of two data sets used by mapping plug-ins 144A-N with the mapping function, in accordance with an embodiment of the present invention. In the embodiment, BigSQL_TAB 310 is a first data source, and DB2_TAB 350 is a second data source. BigSQL_TAB 310 and DB@_TAB 350 each have five rows of data: row 320, row 322, row 324, row 326, and row 328, and row 360, row 362, row 364, row 366, and row 368 respectively. Each of these rows has multiple columns associated with it, such as the identifiers ID 312 and version 354 and the corresponding data found in such columns as num 316, post rewrite 318, name 356, and post rewrite 358. In other embodiments, the data from data sources 142A-N may be less than what is shown, or may be much more extensive, with numerous rows, columns, and data-points.

FIG. 3B is an example of a query sent from remote query source 120 (i.e., FIG. 1), in accordance with an embodiment of the present invention. In this embodiment, the query sent is join query 380, which is sent to mapping plug-ins 144A-N (i.e., FIG. 1). For many database queries, all data from BigSQL_TAB 310 and DB2_TAB 350 (i.e., each of the five data rows) would be returned over network 110. Another location, such as remote query source 120, would determine what data was necessary and remove any data that was unnecessary. However, with mapping plug-ins 144A-N, a JOIN is performed on the local mapping results (i.e., the entirety of the data from BigSQL_TAB 310 and DB2_TAB 350) at the data source. In this embodiment, the mapping function determines that in FIG. 3A, for each row, only row 320 and row 360 have data where ID 312 and ID 352 match, and version 314 and version 354 are equal to each other, as per join query 380's request. Therefore, mapping plug-ins 144A-N transfer only the data from row 320 and the data from row 360 over network 110, thereby reducing the amount of data to be transferred, which subsequently reduces the quantity of resources used.

FIG. 3C is an additional example of a query sent from remote query source 120, in accordance with an embodiment of the present invention. In this embodiment, the query sent is union query 390, which is sent to mapping plug-ins 144A-N. Mapping plug-ins 144A-N perform a UNION on the local mapping results (i.e., the entirety of the data from BigSQL_TAB 310 and DB2_TAB 350) at the data source, so that the FETCH of the first n rows is determined, the additional, unnecessary data is removed, and only the necessary data, such as, in this example, the first 20 rows where DT.PART<100 (see FIG. 3C), are sent over network 110. In other embodiments, the query from remote query source 120 may consist of other SQL queries, or queries in other languages.

Figure 4:
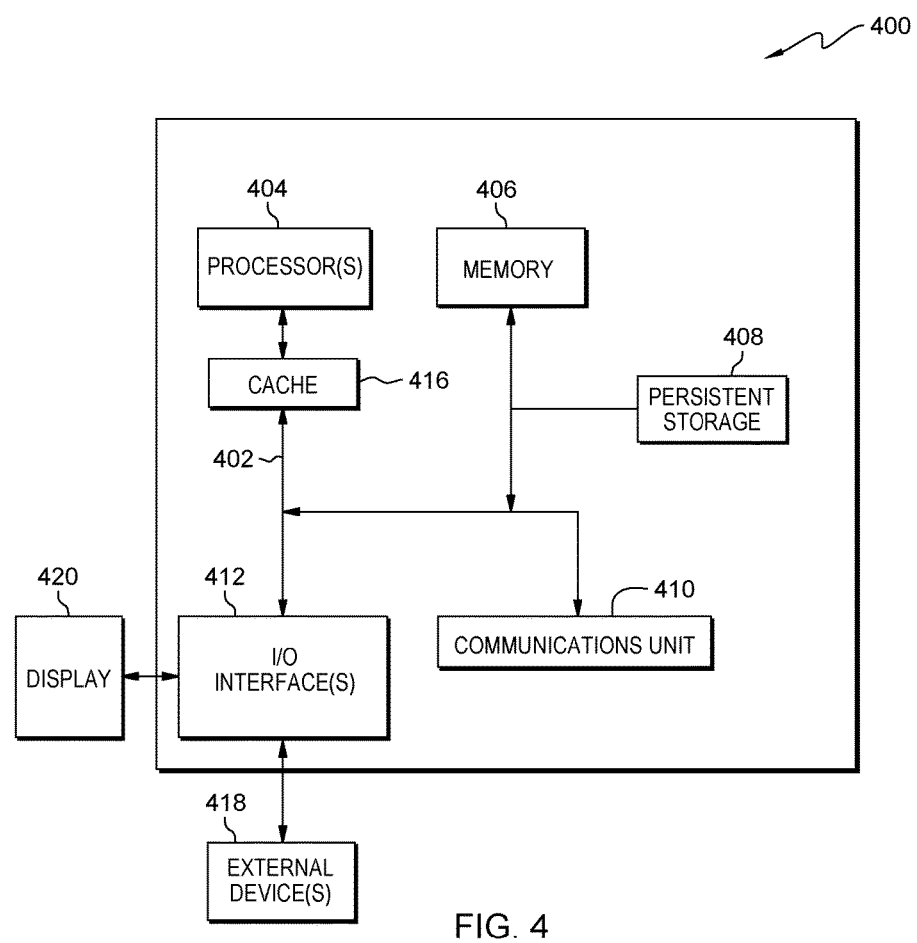
FIG. 4 is a block diagram of internal and external components of the computing device of FIG. 1, in accordance with an embodiment of the present invention.

FIG. 4 is a block diagram of internal and external components of a computer system 400, which is representative of the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to: personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 410 provides for communications with other computer systems or devices via a network (e.g., network 110). In this exemplary embodiment, communications unit 410 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computing device 140 through communications unit 410 (e.g., via the Internet, a local area network or other wide area network). From communications unit 410, the software and data can be loaded onto persistent storage 408.

One or more I/O interfaces 412 allow for input and output of data with other devices that may be connected to computer system 400. For example, I/O interface 412 can provide a connection to one or more external devices 418 such as a keyboard, computer mouse, touch screen, virtual keyboard, touch pad, pointing device, or other human interface devices. External devices 418 can also include portable computer-readable storage media such as, for example, thumb drives, portable optical or magnetic disks, and memory cards. I/O interface 412 also connects to display 420.

Display 420 provides a mechanism to display data to a user and can be, for example, a computer monitor. Display 420 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to: an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for remote query optimization in multi data sources, the computer program product comprising:
a computer readable storage medium and program instructions stored on the computer readable storage medium, the program instructions comprising:
program instructions to receive a database query from a remote source, wherein the query requests one or more groupings of data-points from each of two or more data sources;
program instructions to receive the one or more groupings of data-points from each of the two or more data sources;
program instructions to analyze the one or more groupings of data-points from each of the two or more data sources;
program instructions to create a data set, wherein the data set comprises the analyzed one or more groupings of data-points;
program instructions to transmit the data set to the remote source;
program instructions to map functions for each of the one or more groupings of data-points, wherein mapping functions for each of the one or more groupings of data-points comprises:
program instructions to map a real number for each of the one or more groupings of data-points,
program instructions to compare each of the groupings from the two or more data sources,
program instructions to convert non-integer data-points to integer values, and
program instructions to compute the mapping function using a recursive equation $G(C1)=g(C1)$, $G(C1,C2)=g(C1)+F(G(C2,C3, \ldots, CN))$, $\ldots$, $G(C1,C2, \ldots, Cn)=g(C1)+F(G(C2,C3, \ldots, Cn))$, where $C1, C2, \ldots, CN$ are the groupings for a join, $g(Ci)$ is a mapping function for column $Ci$ to convert $Ci$ to integer values, $F(x)$ is the probability distribution function, and GO is the final mapping function for each grouping;
program instructions to compute a value for each of the one or more mapped functions of the one or more groupings of data-points, wherein the value is based, at least in part, on the mapped functions; and
program instructions to create the data set using the values for each of the one or more mapped functions of the one or more groupings of data-points.

2. The computer program product of claim 1, further comprising:
program instructions to compare the value of the each of the one or more mapped groupings of data-points to the database query from the remote source;
program instructions to determine the value of each of the one or more mapped groupings of data-points that matches the database query from the remote source; and
program instructions to create the data set, wherein the data set is based, at least in part, on the one or more groupings of data-points whose value of the each of the one or more mapped groupings is determined to match the database query from the remote source.

3. The computer program product of claim 2, wherein the database query from the remote source is a SQL JOIN query, and wherein the one or more groupings of data-points for the created data set are: obtained from the two or more data sources; and are combined as per SQL JOIN query rules, when the computed values are found to be related values by the one or more mapped functions.

4. The computer program product of claim 2, wherein the database query from the remote source is a SQL UNION query, and wherein the one or more groupings of data-points for the created data set are: obtained from the two or more data sources; and are combined as per SQL UNION query rules from the result of two or more SELECT statements, including duplicate values from the one or more groupings of data-points when requested by the database query, when the computed values are found to be related values by the one or more mapped functions.

5. The computer program product of claim 1, wherein the computed value for each of the one or more mapped groupings of data-points comprises: original data type if data type for the one or more groupings of data-points is an integer data type, a small string data type if data type for the one or more groupings of data-points is a string data typo, and a float data type if data type for the one or more groupings of data-points is a binary data type.

6. A computer system for remote query optimization in multi data sources, the computer system comprising:
one or more computer processors;
one or more computer readable storage media;
program instructions stored on the one or more computer readable storage media for execution by at least one of the one or more processors, the program instructions comprising:
program instructions to receive a database query from a remote source, wherein the query requests one or more groupings of data-points from each of two or more data sources;
program instructions to receive the one or more groupings of data-points from each of the two or more data sources;
program instructions to analyze the one or more groupings of data-points from each of the two or more data sources;
program instructions to create a data set, wherein the data set comprises the analyzed one or more groupings of data-points;
program instructions to transmit the data set to the remote source;
program instructions to map functions for each of the one or more groupings of data-points, wherein mapping functions for each of the one or more groupings of data-points comprises:
program instructions to map a real number for each of the one or more groupings of data-points,
program instructions to compare each of the groupings from the two or more data sources,
program instructions to convert non-integer data-points to integer values, and
program instructions to compute the mapping function using a recursive equation $G(C1)=g(C1)$, $G(C1,C2)=g(C1)+F(G(C2,C3, \ldots, CN))$, $\ldots$, $G(C1,C2, \ldots, Cn)=g(C1)+F(G(C2,C3, \ldots, Cn))$, where $C1, C2, \ldots, CN$ are the groupings for a join, $g(Ci)$ is a mapping function for column $Ci$ to convert $Ci$ to integer values, $F(x)$ is the probability distribution function, and GO is the final mapping function for each grouping;
program instructions to compute a value for each of the one or more mapped functions of the one or more groupings of data-points, wherein the value is based, at least in part, on the mapped functions; and program instructions to create the data set using the values for each of the one or more mapped functions of the one or more groupings of data-points.

7. The computer system of claim 6, further comprising:

program instructions to compare the value of the each of the one or more mapped groupings of data-points to the database query from the remote source;

program instructions to determine the value of each of the one or more mapped groupings of data-points that matches the database query from the remote source; and program instructions to create the data set, wherein the data set is based, at least in part, on the one or more groupings of data-points whose value of the each of the one or more mapped groupings is determined to match the database query from the remote source.

8. The computer system of claim 7, wherein the database query from the remote source is a SQL JOIN query, and wherein the one or more groupings of data-points for the created data set are: obtained from the two or more data sources; and are combined as per SQL JOIN query rules, when the computed values are found to be related values by the one or more mapped functions.

9. The computer system of claim 7, wherein the database query from the remote source is a SQL UNION query, and wherein the one or more groupings of data-points for the created data set are: obtained from the two or more data sources; and are combined as per SQL UNION query rules from the result of two or more SELECT statements, including duplicate values from the one or more groupings of data-points when requested by the database query, when the computed values are found to be related values by the one or more mapped functions.

* * * * *